Patented Sept. 5, 1933

1,925,159

UNITED STATES PATENT OFFICE 1,925,159

PROCESS OF PREPARING A COFFEE EXTRACT

Gerald L. Wendt, State College, Pa., assignor to Liquid Coffee Products Corporation, a corporation of New York No Drawing. Application December 15, 1928
Serial No. 326,408

2 Claims. (Cl. 99—11)

This invention is a process for making a soluble concentrated coffee extract, in which all of the volatile and aromatic constituents which give to coffee its characteristic flavor and effect, are retained, and are present in the resulting product. The flavors which give coffee its characteristic taste and aroma may be designated "caffeol". The invention also includes the new product made by this process.

The invention consists in making a concentrated infusion of coffee, including its aromatic constituents, including caffeol, with water, or the like, using any of the ordinary means of extraction and especially such mechanical devices as will give a very strong water extract of coffee. To this water extract, according to my process, is added a proportion of pure glycerine varying from 3 to 20% of the amount of water extract. The glycerine dissolves in the water extract.

This extract containing glycerine is now subjected to evaporation in a vacuum still at the lowest possible temperature and the highest possible vacuum. During this distillation the water that was originally used distills from the extract and should pass into the condenser as clean, colorless, and odorless water leaving behind in the glycerine all the aromatic and flavoring constituents of the extract which are held there by the glycerine.

Toward the end of the distillation the temperature must be raised to remove the last traces of water but never above 90 degrees centigrade. The distillation, therefore, begins at about 30 degrees centigrade and ends at 90 degrees centigrade. By this method the water can be completely removed and the result is a glycerine solution of the aromatic and flavoring constituents of the coffee bean including the caffeine and caffeol, which are held in solution in the glycerine. The resulting product is, therefore, available as a "liquid coffee" and can be used for the preparation of coffee beverage by dissolving small quantities of it in larger quantities of water or can be used for any other purpose as a concentrated coffee flavor.

Since the glycerine is mixed with water, it is not necessary to use dehydrated glycerine, but any grade of chemically pure glycerine may be used.

Making the water extract of the coffee beans is a matter of common knowledge and such extract may be made by any of the large variety of methods now in use. The usual way of making the coffee infusion is to take roasted coffee beans, preferably freshly roasted and to grind them to any desired degree of fineness and then boil them with water or treat them with water in a boiler, percolator, or other suitable apparatus, preferably closed, for preventing the escape of volatile constituents of coffee. Sufficient coffee to make a strong solution or infusion should be used. The counter-current process may be used in making the coffee infusion, for better efficiency. In practice, the coffee grains may be put in, say three, percolators or the like, suitably heated, and the hot water can pass through the percolators in series. Fresh coffee grounds are put into the last percolator in the series, so that these grounds are treated with a solution which has already extracted the grounds in the first two percolators. The fresh water comes into the other end of the system and acts first on grounds which have been extracted twice, passes into the second percolator and acts on grounds which have been extracted once and then into the third or last percolator, where it acts on fresh grounds. Any given batch of coffee is extracted first with a solution which has been through two percolators, then with a solution which has been through one percolator and is then treated with fresh water.

The water infusion of coffee prepared in the above or any other suitable manner is then mixed with glycerine in proportions varying from 3% to 20% of the water infusion or extract. The resulting mixture is then distilled, preferably under a vacuum, at gradually increasing temperatures in order to evaporate the water from the mixture and leave the glycerine containing the extracted coffee. This step is carried out, as stated, under a relatively high vacuum in order that low temperatures can be used, at which temperatures the aromatic components of the coffee will not be driven off but will be taken up and retained by the glycerine and the water which is removed by the distillation may be condensed as a clean colorless and odorless liquid. The temperatures which are most suitable for the distillation range from about 30° C. upward to not exceeding 90° C. in order that the aforementioned results may be secured.

This process is preferably carried out in apparatus in which the several substances do not come into contact with metallic surfaces. The apparatus used should, therefore, be lined with glass, porcelain, wood or the like.

It should be understood that the invention is not limited to the exact procedure outlined, but may be carried out in other ways, as defined within the scope of the claims.

I claim as my invention:

1. The process of making a concentrated coffee extract which comprises preparing a strong water infusion by treating roasted, ground coffee with hot water at a temperature not substantially exceeding its boiling point, mixing the infusion with glycerine in proportion not exceeding 20% of the infusion, evaporating water from the resulting mixture under a vacuum at temperatures not exceeding approximately 90° C., whereby substantially all of the coffee components of the infusion are retained in the glycerine which forms a concentrated coffee extract.

2. The process of making a concentrated coffee extract containing the aromatic constituents which comprises treating roasted, ground coffee with hot water at a temperature not exceeding its boiling point to prepare a strong water infusion, mixing not more than 20% of glycerine with the infusion, subjecting the mixture to heat under a vacuum at temperatures gradually increasing to 90° C. at the end of the evaporation to remove the water and leave the coffee components concentrated in the glycerine.

GERALD L. WENDT.